United States Patent [19]

Mooney et al.

[11] 4,010,694
[45] Mar. 8, 1977

[54] LOAD TIE-DOWN AND ANCHOR SYSTEM

[76] Inventors: Gerald R. Mooney, 3080 Eldogor Lane, New Castle, Pa. 16105; Louis A. Mooney, 1002 Ryan Ave., New Castle, Pa. 16101

[22] Filed: May 21, 1975

[21] Appl. No.: 579,621

[52] U.S. Cl. .............................. 105/482; 105/476; 280/179 A
[51] Int. Cl.² ...................... B60P 7/10; B60P 7/16; B61D 45/00; B61D 49/00
[58] Field of Search .......... 105/475, 476, 477, 478, 105/479, 480, 481, 482, 483, 484, 485; 280/179 A

[56] References Cited

UNITED STATES PATENTS

| | | | |
|---|---|---|---|
| 1,450,897 | 4/1923 | Stemmler | 280/179 A |
| 2,610,587 | 9/1952 | Pietzsch | 105/481 |
| 2,713,499 | 7/1955 | Wagner | 280/179 A |
| 3,294,354 | 12/1966 | Batey | 105/482 |
| 3,315,617 | 4/1967 | Schwiebert et al. | 280/179 A |
| 3,429,537 | 2/1969 | Jantzen | 105/481 |
| 3,633,937 | 1/1972 | Hlinsky | 280/179 A |
| 3,713,616 | 1/1973 | Bowers | 105/482 |
| 3,791,623 | 2/1974 | Bozik | 280/179 A |
| 3,837,048 | 9/1974 | Lewes et al. | 105/485 X |

Primary Examiner—Robert J. Spar
Assistant Examiner—Howard Beltran
Attorney, Agent, or Firm—Colton & Stone, Inc.

[57] ABSTRACT

A load tie-down and anchor system for securing load binding chains or the like to a carrier vehicle such as a flat bed trailer is provided with anchor points which may be selectively positioned. Ways for the anchors are formed of a series of support plates mounted in equally spaced, parallel relation to one another. Each plate has a keyhole shaped slot and each anchor assembly includes an elongated bar slidably received in the larger portion of the slot. The bar is slightly longer than twice the spacing between adjacent support plates. An eye or other attachment member is carried by the bar at a point between one end and the midpoint thereof. The opposite half of the bar carries a retaining plate which is approximately as long as the spacing between two adjacent support plates and which is movable between a first position in which the retaining plate lies between the adjacent support plates and a second position in which the retaining plate is spaced from the support plates to permit sliding movement of the anchor assembly along the ways.

15 Claims, 10 Drawing Figures

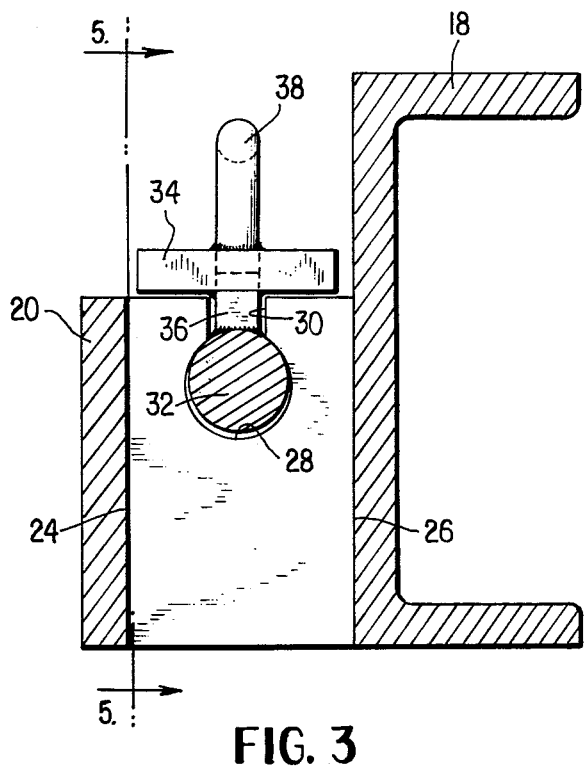
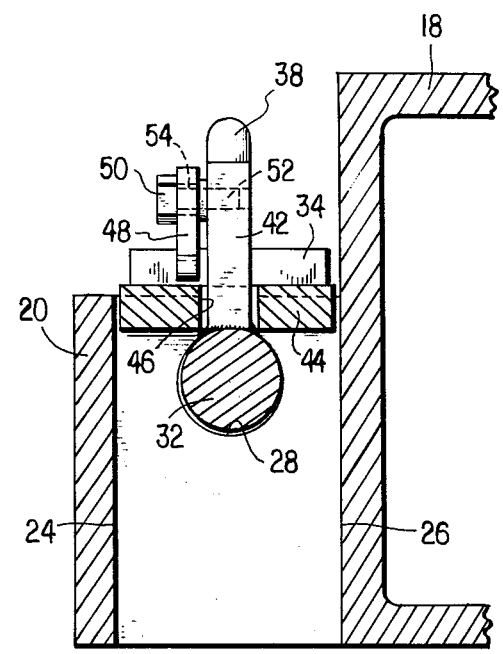
FIG. 3  FIG. 4
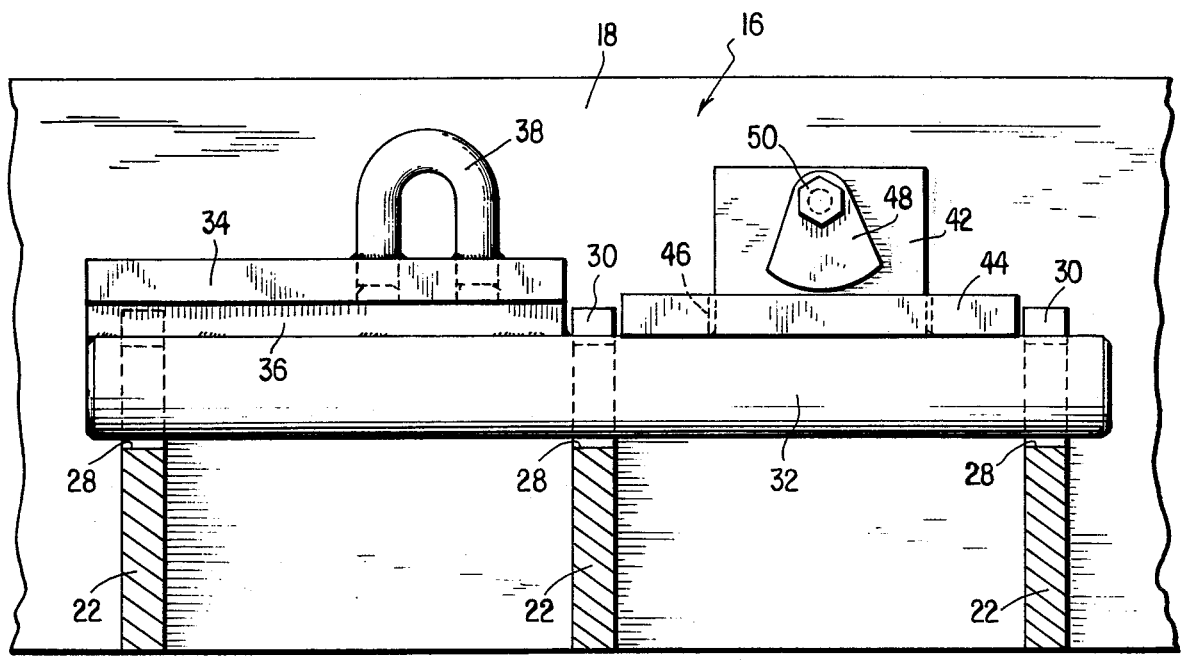
FIG. 5

LOAD TIE-DOWN AND ANCHOR SYSTEM

BACKGROUND OF THE INVENTION

The present invention relates to load tie-down systems for vehicles and, more particularly, to adjustably positionable anchor arrangements for securing load binder chains or the like to a vehicle bed or body.

It is common practice to secure loads on vehicles such as flat bed trailers and railway flat cars by the use of binder straps, chains and the like which are connected to anchor points on the vehicle. Because of the wide variations in load configurations, dimensions, etc. which may be carried by a vehicle, it is also common practice to provide some means for adjustably positioning the anchor points. Numerous such arrangements have been designed over the years. Examples of positionally adjustable anchor devices are illustrated in U.S. Pat. Nos. 2,610,587, Pietzsch; 2,713,499 Wagner; 3,315,617, Schwiebert et al; and 3,633,937, Hlinsky.

Many of the adjustable anchor arrangements of the prior art include bottom channels in which the anchor devices are slidably mounted. Closed bottom channels are subject to clogging with dirt, debris, and when the anchor arrangement is installed on an open-topped vehicle such as a flat bed trailer or railway flat car, with snow and ice. Other known positionally adjustable anchor systems involve complex latching systems for retaining the anchors in the desired positions. The complexity, however, contributes to the cost of the assemblies and to the likelyhood of malfunction. Still other prior art units employ removable pins or bolts to secure the anchor in position. With such arrangements, there is a problem of losing the pins or bolts.

It is the primary object of the present invention to provide a positionally adjustable load tie-down anchor assembly which is characterized by its simplicity of construction and operation, reliablility and durability.

Another object of the present invention is the provision of a positionally adjustable anchor assembly which may be readily incorporated into new equipment without necessitating major design modifications therein and which is capable of being added to existing equipment inexpensively.

A further object of the invention is the provision of a positionally adjustable anchor assembly which may be installed on a flat bed trailer so as not to interfere with or obstruct any portion of the load carrying of the trailer.

Yet another object of the invention is the provision of a positionally adjustable anchor assembly which includes a latching arrangement having only two moving parts and which is characterized by the absence of separable or removable components.

BRIEF SUMMARY OF THE INVENTION

The above and other objects of the invention which will become apparent in the following detailed description of the invention are achieved by the provision of a load tie-down anchor assembly which includes a plurality of support plates mounted in uniformly spaced, parallel relationship to one another, each support plate having a keyhole slot extending from one edge thereof; and an anchor assembly comprised of an elongated bar slidable in the keyhole slots and of a length slightly greater than twice the distance between adjacent ones of said support plates, an eye or other securement engaging means rigidly affixed to said bar at a point intermediate the midpoint and one end thereof, a retainer plate connected to said bar at the opposite side of the midpoint from said eye, said retainer plate being of a length only slightly less than the spacing between adjacent support plates and movable between a first position in which said retainer plate lies between two adjacent support plates and a second position in which said retainer plate is spaced from said support plates, and latch means for holding said retainer plate in said first position.

For a more complete understanding of the invention and the objects and advantages thereof, reference should be had to the following detailed description and the accompanying drawings wherein preferred embodiments of the invention are disclosed.

BRIEF DESCRIPTION OF THE DRAWINGS

In the drawings:

FIGS. 3 and 4 are fragmentary transverse sectional views taken along the lines 3—3 and 4—4, respectively, of FIG. 2;

FIG. 5 is a fragmentary longitudinal sectional view taken along the line 5—5 of FIG. 4;

DETAILED DESCRIPTION OF THE PREFERRED EMBODIMENTS

Figure 1:
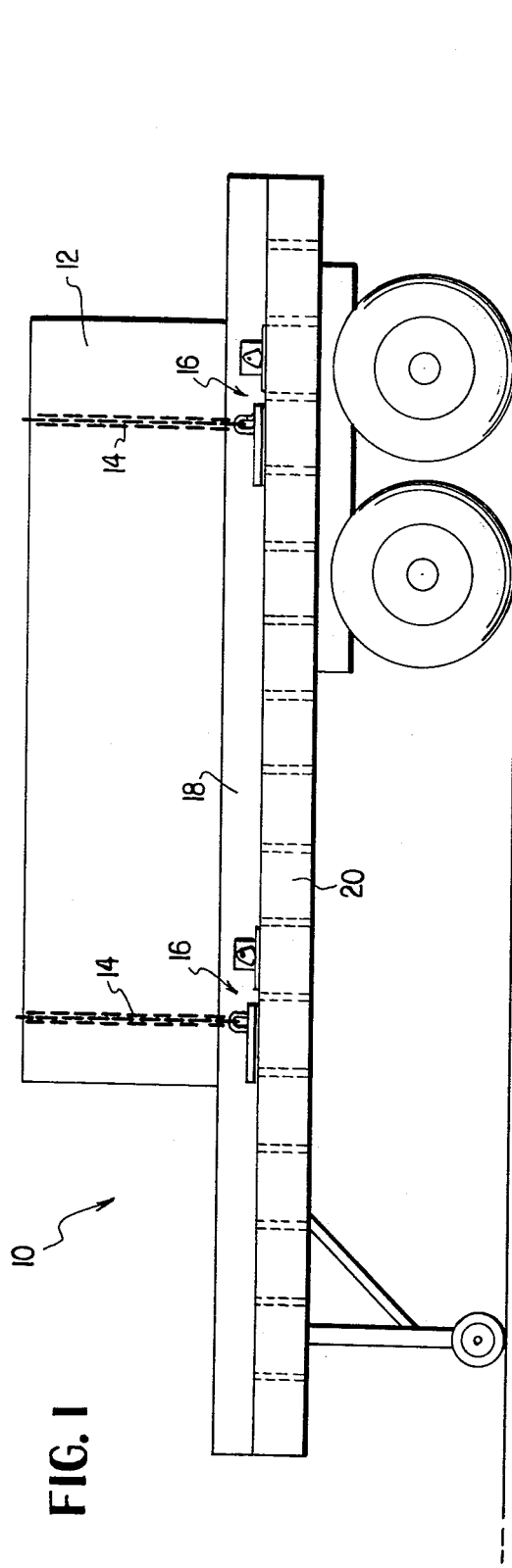
FIG. 1 is a side elevational view of a flat bed trailer equipped with the load tie-down system of the present invention.
Figure 2:
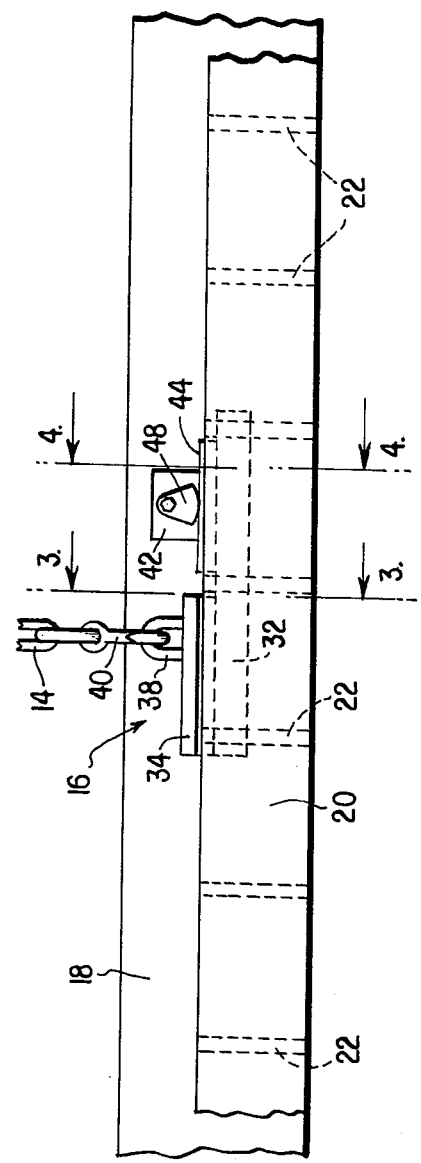
FIG. 2 is a fragmentary side elevational view, on an enlarged scale relative to FIG. 1, of the flat bed trailer and load tie-down system.
Figure 6:
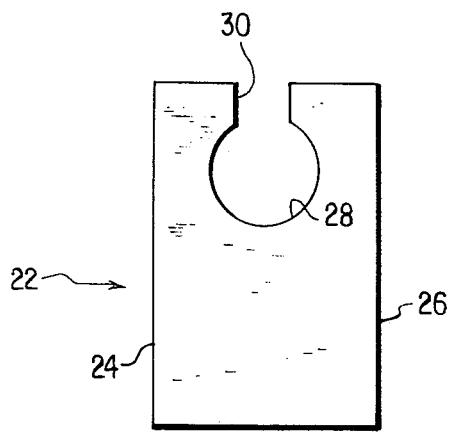
FIG. 6 is an elevational view of a support plate comprising a component of the tie-down system.
Figure 7:
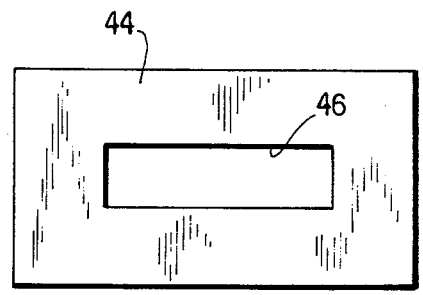
FIG. 7 is a plan view of a retainer plate comprising a component of the tie-down system.
Figure 8:
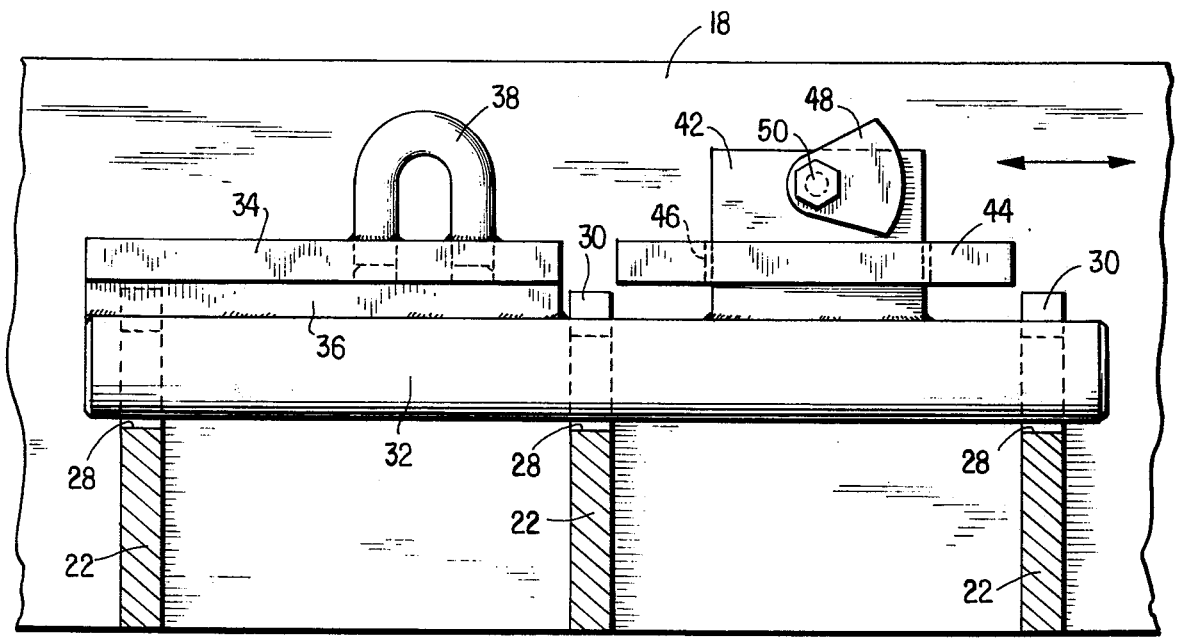
FIG. 8 is a fragmentary longitudinal sectional view taken along the same plane as FIG. 5 but showing the tie-down anchor in its released position.

The embodiment of the invention illustrated in FIGS. 1–8 is adapted for use on a flat bed trailer, designated generally by reference numeral 10. It will be understood, however, that the load tie-down system of our invention is not limited to use solely with flat bed trailers but rather may be used in conjunction with any type of transportation equipment.

A load 12 is secured to the bed of the trailer 10 by tie-down chains or straps 14 which are attached by anchors 16. As will become apparent hereinafter, the anchors 16 may be located at any desired positions along the length of the trailer 10. While only two anchors are shown in FIG. 1, additional ones may be provided as needed to secure the particular load being carried by the trailer.

With the exception of the positionally adjustable load tie-down system, the trailer 10 is of conventional construction having side framing members such as channels 18 and rub rails 20 spaced from the side channels 18. In place of the conventional spacers used to connect the rub rail 20 to the side members 18 of the trailer bed, a plurality of support plates 22 are provided. These plates are located at uniformly spaced intervals along the length of the trailer and extend at right angles to the side channels 18 and rub rails 20. In a typical installation the support plates 22 are spaced at four inch center-to-center intervals. As can be seen from FIG. 6, the support plates 22 have straight, parallel side edges 24 and 26 which abut the rub rail 20 and side member 18, respectively. Each plate 22 has a circular opening 28 and a slot 30 extending from the opening 28 to the upper edge of the plate.

Slidably received within the circular openings 28 of the support plates 22 is an elongated bar 32. The bar 32 is slightly longer than twice the distance between the two adjacent support plates so that it is received in three successive plates 22 when in operative position. A mounting plate 34 is rigidly secured by means of a spacer block 36 to the bar 32, the plate 34 extending along approximately one half the length of the bar 32. The spacer block 36 is of sufficient thickness as to position the lower surface of the mounting plate 34 slightly above the plane of the top surfaces of the support plates 22 and of a width slightly less than the thickness of the slot 30. Affixed to and projecting from the upper surface of the mounting plate 34 is a U-bolt 38 which serves as an anchor point for the hook 40 of the load binder chain 14.

The opposite half portion of the bar 32 carries a retainer assembly for holding the anchor assembly in its selected position along the way defined by the support plates 22. The retainer assembly includes a lug 42 secured to and projecting transversely outwardly from the bar 32. As can be seen from FIG. 5, the lug 42 is located as to substantially centered between adjacent support plates 22 when the anchor assembly is in its operative position. The lug 42 is of a width slightly less than that of the slot 30 and lies in the same plane as a spacer block 36. A retainer plate 44 having a central opening 46 fits over the lug 42 and normally rests on the bar 32. The outer end of the lug 42 carries a latch 48, the latch being retained by a bolt 50 threaded into an opening 52 in lug 42 and carrying a bushing 54 allowing the latch 48 to rotate on the bolt 50. As can be seen from FIGS. 4 and 5, the latch 48 has an enlarged lower portion and hangs downwardly with its lower surface closely adjacent the upper surface of the retainer plate 44, preventing the retainer plate from being moved upwardly. The retainer plate is nearly equal in length to the separation between adjacent ones of the support plates 22 and, when in its normal position, as shown in FIGS. 4 and 5, lies between the upper ends of the adjacent support plates.

In its normal position, the retainer plate 44 prevents sliding movement of the bar 32 and, hence, of the anchor assembly 16 along the ways defined by the support plates 22. The latch 48 serves to prevent the retainer plate 44 from being accidentally jarred from its normal position. When it is desired to position the anchor assembly 16 at a different point along the length of the trailer, the latch 48 is pivoted to the position shown in FIG. 8. With the latch in this position, the retainer plate may be lifted sufficiently so as to clear the upper edges of the support plates 22 and the anchor assembly slid to the desired location. It should be noted that the retainer plate 44 and latch 48 are not removed from the lug 42.

Since the anchor assemblies are mounted in the space between the side edges of the trailer and the rub rail, there are no discontinuities required in the load bearing portions of the trailer bed. It should also be noted that the anchor assemblies 16 do not project above the plane of the trailer bed so that they do not interfere with and are not susceptible to being damaged by side loading or unloading of the trailer. As a consequence of the use of vertically oriented support plates 22 to constitute the ways in which the anchor assemblies 16 are movable, the present invention avoids the problems encountered when closed-bottom channels are used. With the above described arrangement, there are no closed-bottom areas in which dirt or debris can accumulate.

Although not shown in the drawings, stake pockets may be provided in conjunction with the rub rails of the trailer. These may be located in the region between the rub rail 20 and the trailer side member 18 and below the lower edge of the openings 28 in the support plates 22 without interfering with the anchor assemblies 16.

Figure 9:
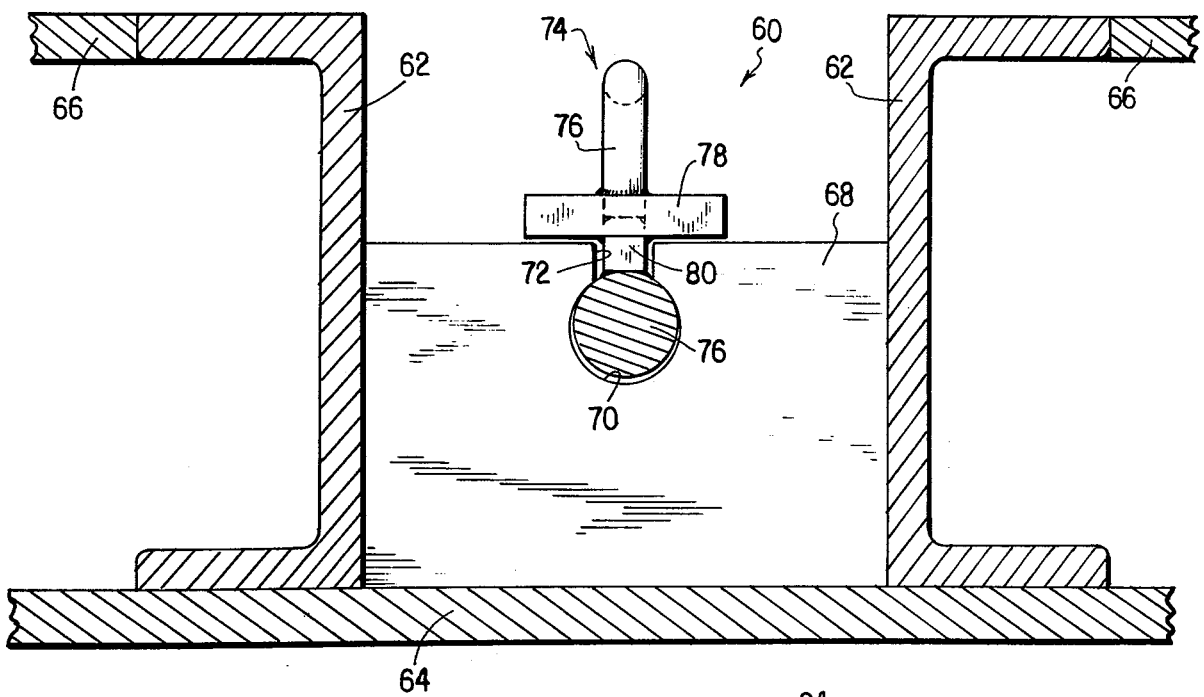
FIG. 9 is a fragmentary transverse sectional view of a second embodiment of the load tie-down system of the present invention.

A modification of the tie-down system of the present invention adapted for use in locations other than along the side edges of a trailer on the like is illustrated in FIG. 9. In this embodiment, a channel 60 is defined by side wall members 62 extending between a subfloor 64 and a floor 66 which may, for example, be the subfloor and floor of a box car or closed trailer. Support plates 68 are secured at uniformly spaced intervals along the length of the channel 60 and extend transversely thereacross. The support plates 68 are substantially identical to the plates 22 of the previously described embodiment and include circular openings 70 and slots 72 extending from the openings 70 to the top edges of the plates 68. The anchor assemblies, designated generally by the reference numeral 74, may be identical construction to the devices 16 previously described. Each anchor assembly 74 includes an elongated bar 76 slidably received in the circular openings 70 of the support plates 68, an eye or other attachment means 76 secured to a mounting plate 78, a spacer block 80 connecting the mounting plate 78 to the bar 76 and a retainer plate and latch assembly (not illustrated).

Figure 10:
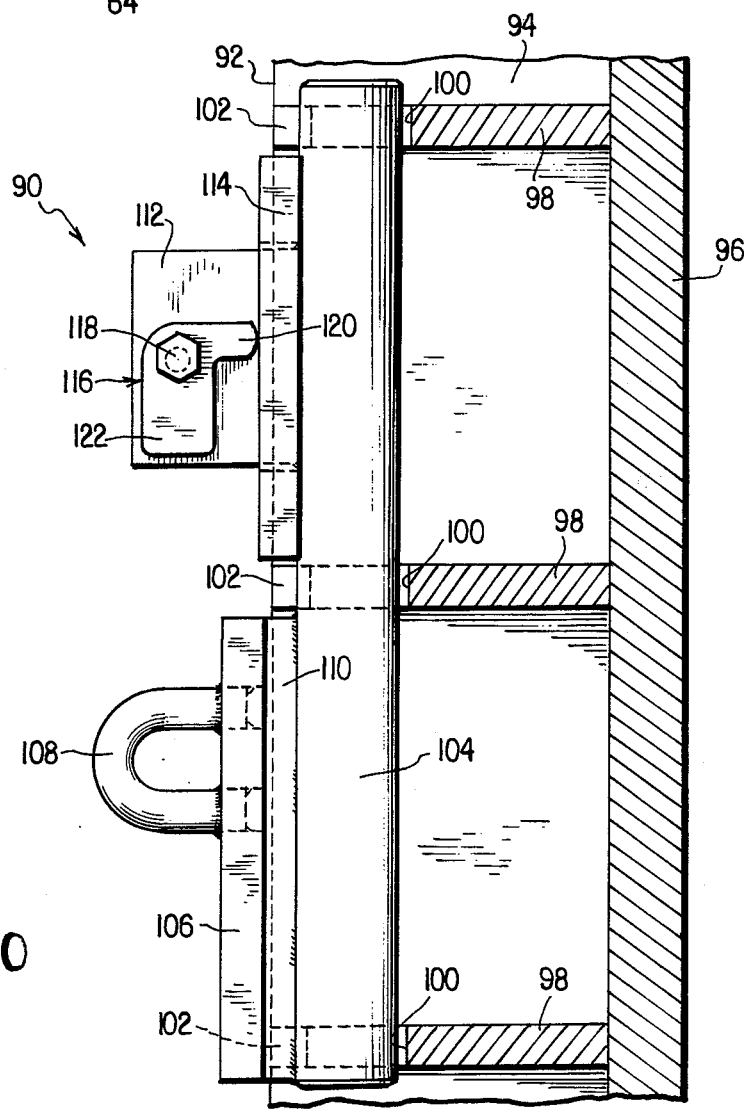
FIG. 10 is a fragmentary vertical sectional view of a further modification of the load tie-down system of the present invention.

FIG. 10 illustrates a further modification of the tie-down system of the present invention this modification being adapted for vertical positional adjustment. The anchor assembly of this embodiment, designated generally by the reference numeral 90, is vertically positionally adjustable in a channel located between inner and outer walls 92 and 96, respectively, and having side walls 94. The walls 92 and 96 may be the inner and outer walls of an enclosed trailer or box car, for example. Support plates 98, generally similar to the support plates 22 and 68 of the previously described embodiments, are secured at uniformly spaced intervals along the vertical channel. Each support plate 98 has a circular opening 100 and a slot 102 extending from the circular opening to the outer edge of the plate. As in the previously described embodiments, an elongated bar 104 is slidably received in the circular openings 100 with the bar 104 being of sufficient length as to extend through three support plates 98. A mounting plate 106 carrying an eye or other securement means 108 is affixed to the bar 104 by means of a spacer block 110 of sufficient thickness so as to space the mounting plate 106 outwardly of the front edges of the support plates 98. The spacer block 110 is secured to the bar 104 along a portion thereof intermediate the midpoint and one end of the bar. The latch means for holding the anchor assembly 90 in its selected position is carried by the opposite half portion of the bar 104 and includes a lug 112 projecting outwardly from the bar 104, a retaining plate 114 and a latch member 116 secured to the lug 112 by means of a bolt 118. The latch member 116 includes a first leg 120 which projects toward the retainer plate 114 when the latch member is in its normal position, serving to hold the the plate 114 against the bar 104 so that the edge of the retainer plate contacts the side face of the support plate 102 immediately below the retainer plate. When the latch member is rotated 90° in the clockwise direction, when viewed as in FIG. 10, sufficient clearance is provided to permit the retainer plate 114 to be moved outwardly to a position clear of the support plates 98, thereby allowing the anchor assembly 90 to be repositioned as desired. A second leg 122 is also provided on the latch member 116 and serves as a counterbalance to hold the latch member in its normal position.

It should be understood that, while the preferred embodiments of our invention have been illustrated and described in conjunction with highway and railway vehicles, the anchor assemblies of the invention may be used in other types of installations, the system being usable in any situation in which positionally adjustable anchor points are needed. Also, while U-bolts have been illustrated as the anchor points, other types of securement means may be used in place thereof.

We claim:

1. A positionally adjustable anchor assembly for use in conjunction with a flat bed load carrying vehicle having a side frame member and a rub rail in spaced, parallel relation to said side frame member, comprising:
   a plurality of support plates located between and secured to said side frame member and said rub rail in a uniformly spaced, linear array, said plates being parallel to one another and each plate having an opening therethrough and a slot extending from said opening to an edge of said plate, the width of said slot being less than the maximum width of said opening;
   a bar slidably received in said openings of said plates, the width of said bar being greater than the width of said slot and the length thereof being greater than the separation between adjacent ones of said support plates;
   anchor means secured to said bar; and
   locking means connected to said bar and movable between a first position preventing sliding movement of said bar in said support plates openings and a second position permitting sliding movement of said bar in said support plate openings.

2. The anchor assembly of claim 1 wherein said locking means comprises a retainer plate the length of which is nearly equal to the separation between adjacent ones of said support plates and means connecting said retainer plate to said bar, said connecting means permitting movement of said retainer plate between a first position in which said retainer plate is located between adjacent ones of said support plates and a second position in which said retainer plate is spaced from said support plates.

3. The anchor assembly of claim 2 wherein said locking means further includes latch means for releasably securing said retainer plate in said first position.

4. The anchor assembly of claim 3 wherein said retainer plate has a central opening and said locking means further includes a lug secured to and projecting transversely from said bar, said lug extending through said retainer plate opening, said latch means being carried by the portion of said lug projecting beyond said retainer plate.

5. The anchor assembly of claim 1 wherein the length of said bar is greater than twice the separation between adjacent ones of said support plates, said anchor means and said locking means being located on opposite sides of the midpoint of said bar.

6. A positionally adjustable anchor assembly for use in conjunction with a load carrying vehicle, comprising:
   a plurality of support plates secured to said vehicle in a uniformly spaced, linear array, said plates being parallel to one another and each plate having an opening therethrough and a slot extending from said opening to an edge of said plate, the width of said slot being less than the width of said opening;
   a bar slidably received in said openings of said plates; the width of said bar being greater than the width of said slot and the length thereof being greater than the separation between adjacent ones of the support plates;
   anchor means secured to said bar;
   a lug secured to and projecting transversely from said bar;
   a retainer plate having a central opening whereby said retainer plate is slidably received on said lug, said retainer plate being of a length nearly equal to the separation between adjacent ones of said support plates and being movable on said lug between a first position in which said retainer plate is located between adjacent ones of said support plates and a second position in which said retainer plate is spaced from said support plates; and
   a latch member connected to the portion of said lug projecting beyond said retainer plate, said latch member being rotatable between a first position in which said latch member extends to a point closely adjacent said retainer plate when said retainer plate is in its said first position and a second position in which said latch member is remote from said retainer plate.

7. The anchor assembly of claim 6 wherein said latch member is counterbalanced so as to normally hang in said first position.

8. The anchor assembly of claim 7 wherein the length of said bar is greater than twice the separation between adjacent ones of said support plates, said anchor means and said locking means being located on opposite sides of the midpoint of said bar.

9. A positionally adjustable anchor assembly for use in conjunction with a load carrying vehicle, comprising:
   a plurality of support plates secured to said vehicle in a uniformly spaced, linear array, each support plate having an opening therein and a slot extending from said opening to an edge of said plate, the width of said slot being less than the maximum width of said opening;
   a bar slidable in said openings of said support plates and of sufficient length as to extend through three successive ones of said support plates, the width of said bar being greater than that of said slots;
   anchor means secured to said bar at a point intermediate one end and the midpoint thereof; and
   a retainer plate carried by said bar on the opposite side of the midpoint thereof from said anchor means, said retainer plate being of a length nearly equal to the distance between successive ones of said support plates and movable between a first position in which said retainer plate is located between adjacent ones of said support plates and a second position in which said retainer plate is spaced from said support plates.

10. The assembly of claim 9 further including latch means connected to said bar and operable to hold said retaining plate in said first position.

11. The assembly of claim 10 wherein said latch means includes a lug secured to and projecting transversely from said bar and a latch member pivotally mounted on said lug and counterbalanced so as to normally hang in a first position holding said retaining plate in its first position and rotatable to a second position permitting said retainer plate to be moved to its second position.

12. A positionally adjustable anchor assembly for use in conjunction with a flat bed vehicle having side frame members and rub rails mounted in spaced, parallel relation to said side frame members, comprising:
 a plurality of support plates mounted between said side frame members and said rub rails in a uniformly spaced, linear array, each support plate having an opening therein and a slot extending from said opening to an edge of said plate, the width of said slot being less than the maximum width of said opening;
 a bar slidable in said openings of said support plates and of sufficient length as to extend through three successive ones of said support plates, the width of said bar being greater than that of said slots;
 anchor means secured to said bar at a point intermediate one end and the midpoint thereof; and
 a retainer plate carried by said bar on the opposite side of the midpoint thereof from said anchor means, said retainer plate being of a length nearly equal to the distance between successive ones of said support plates and movable between a first position in which said retainer plate is located between adjacent ones of said support plates and a second position in which said retainer plate is spaced from said support plates.

13. A positionally adjustable anchor assembly for use in conjunction with a load carrying vehicle having at least one elongated channel defined by spaced, parallel side walls comprising:
 a plurality of support plates secured to said side walls in a uniformly spaced, linear array, each support plate having an opening therein and a slot extending from said opening to an edge of said plate, the width of said slot being less than the maximum width of said opening;
 a bar slidable in said openings of said support plates and of sufficient length as to extend through three successive ones of said support plates, the width of said bar being greater than that of said slots;
 anchor means secured to said bar at a point intermediate one end and the midpoint thereof; and
 a retainer plate carried by said bar on the opposite side of the midpoint thereof from said anchor means, said retainer plate being of a length nearly equal to the distance between successive ones of said support plates and movable between a first position in which said retainer plate is located between adjacent ones of said support plates and a second position in which said retainer plate is spaced from said support plates.

14. The assembly of claim 13 wherein said channel extends horizontally.

15. The assembly of claim 13 wherein said channel extends vertically.

* * * * *